United States Patent Office 3,794,665
Patented Feb. 26, 1974

3,794,665
2,5-DISUBSTITUTED 1,3,4-THIADIAZOLES
Gerald Berkelhammer, Princeton, and Goro Asato, Titusville, N.J., assignors to American Cyanamid Company, Stamford, Conn.
No Drawing. Application Nov. 25, 1970, Ser. No. 92,908, now Patent No. 3,725,396, which is a continuation-in-part of application Ser. No. 767,004, Oct. 11, 1968, now Patent No. 3,598,830. Divided and this application Oct. 25, 1972, Ser. No. 300,640
Int. Cl. C07d 33/50, 91/62
U.S. Cl. 260—306.8 D          5 Claims

ABSTRACT OF THE DISCLOSURE

This invention relates to novel 5-amino, 5-acetamido and 5-nitro-2-substituted 1,3,4-thiadiazoles and their derivatives. These compounds are useful as antibacterial or anti-fungal agents.

---

This application is a division of application Ser. No. 92,908, filed Nov. 25, 1970, now U.S. Pat. 3,725,396, which is a continuation-in-part of our application Ser. No. 767,004, filed Oct. 11, 1968, now U.S. Pat. 3,598,830.

SUMMARY OF THE INVENTION

The present invention relates to novel thiadiazole compounds, a method for their preparation and a method of use for controlling bacteria and fungi, particularly plant pathogenic bacteria and fungi. More particularly, the novel compounds of the invention have the formula:

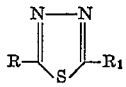

wherein R is selected from the group consisting of amino, nitro and lower alkanoylamino and $R_1$ is selected from the group consisting of

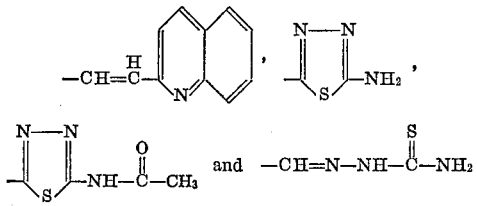

In the preparation of the present compounds as shown in the flowsheets and examples hereinafter set forth three essential starting materials are used. The first of these is 5-nitro-1,3,4-thiadiazole-2-carboxaldehyde, the product of Examples 1 and 4, and described in the flow diagrams as Compound IV. The second is 5-amino-1,3,4-thiadiazole-2-carboxaldehyde, the product of Example 3, identified as Compound III in the flow diagrams and 5-acetamido-1,3,4-thiadiazole-2-carboxaldehyde, the product of Example 11 and referred to in the flow diagrams as Compound XI.

In accordance with the invention and referring to flow diagram I, 5-nitro - 1,3,4 - thiadiazole-2-carboxaldehyde (IV) can be prepared by oxidation of 2-methyl-5-nitro-1,3,4-thiadiazole (I) at high temperature. The reaction is preferably carried out in the presence of an inert organic solvent and employing an oxidizing agent such as, for example, selenium dioxide. Said Compound IV may also be prepared from 5-amino-1,3,4-thiadiazole-2-carboxaldehyde (III) by formation of the aldehyde diazonium salt followed by reaction with excess alkali metal nitrite in the presence of a copper catalyst.

The 5-nitro-2-thiadiazole-carboxaldehyde (IV) may then be converted to 3-{[(5-nitro-1,3,4-thiadiazol-2-yl)-methylene]amino}-2-oxazolidinone (V), 1-{[(5-nitro-1,3,4-thiadiazol-2-yl)methylene]amino} - 2 - imidazolidinone (VI) or 5-nitro-1,3,4-thiadiazole-2-carboxaldehyde thiosemicarbazone (VII) by reaction of the above said carboxaldehyde (IV) with 3-amino-2-oxazolidinone, 1-amino - 2 - imidazolidinone or thiosemicarbazide, respectively. The reactions are preferably conducted in an alcoholic or aqueous-alcoholic medium at an elevated temperature, generally between about 70° C. and 115° C. and under slightly acidic conditions. Mineral acids such as hydrochloric and sulfuric acid are well adapted to use in these reactions.

Similarly, treatment of 5-amino-1,3,4-thiadiazole-2-carboxaldehyde (III) (Flow Diagram II) or 5-acetamido-1,3,4-thiadiazole-2-carboxaldehyde (XI) (Flow Diagram III) with 1-amino-2-imidazolidinone, 3-amino-2-oxazolidinone or thiosemicarbazide, under acid conditions at an elevated temperature, yields respectively, the corresponding 1-{[(5-amino-1,3,4-thiadiazol-2-yl)methylene]amino}-2-imidazolidinone (XII),
3-{[(5-amino-1,3,4-thiadiazol-2-yl)-methylene]amino}-2-oxazolidinone (XV),
5-amino-1,3,4-thiadiazolecarboxaldehyde thiosemicarbazone (XVII),
and 1-{[(5-acetamido-1,3,4-thiadiazol-2-yl)methylene] amino}-2-imidazolidinone (XIII),
3-{[(5-acetamido-1,3,4-thiadiazol-2-yl)methylene] amino}-2-oxazolidinone (XIV), and
5-acetamido-1,3,4-thiadiazole-2-carboxaldehyde thiosemicarbazone (XVI).

Cyclization of 5-nitro-1,3,4-thiadiazole-2-carboxaldehyde thiosemicarbazone (VII), (Diagram I), 5-amino-1,3,4-thiadiazolecarboxaldehyde thiosemicarbazone (XVII), (Diagram II), and 5-acetamido-1,3,4-thiadiazole-2-carboxaldehyde thiosemicarbazone (XVI), (Diagram III), to the corresponding aminothiadiazoles can then be achieved by treatment of said thiosemicarbazones with an oxidative cyclizing agent such as ferric ammonium sulfate, ferric chloride or ferric sulfate, at an elevated temperature preferably between about 70° C. and 115° C. in water or aqueous alcohol.

Treatment of the cyclized bis amino compound (XVIII) (Diagram II) with acetic anhydride at high temperature, yields the corresponding bis acetamido compound (XIX).

When the 5-nitro- (IV) or 5-acetamido-1,3,4-thiadiazole carboxaldehydes (XI) are reacted with quinaldine and acetic anhydride under acid conditions and high temperature the corresponding thiadiazol-2-yl vinyl quinolines (XX) and (XXI) respectively, are formed. However, the 5-amino carboxaldehyde (III) does not undergo the same reaction to form the corresponding 5-amino vinyl quinoline, but rather, yields the 5-acetamido vinyl quinoline (XXI) which is converted by acid hydrolysis to the 2-[2-(5-amino-1,3,4-thiadiazol-2-yl)vinyl]quinoline (XXII), (Diagram III).

In Flow Diagram (II) it can be seen that 5-amino-1,3,4-thiadiazole-2-carboxaldehyde (III) may be obtained by first refluxing p-nitrobenzaldehyde with 2-acetamido-5-methylthiadiazole in acetic anhydride to obtain β-(5-acetamido-1,3,4-thiadiazol-2-yl)-p-nitrostyrene (II) and ozonizing such product in the presence of ethyl acetate to yield a crude product containing 5-acetamido-1,3,4-thiadiazole-2-carboxaldehyde (XI) which may be hydrolyzed to 5 - amino-1,3,4-thiadiazole-2-carboxaldehyde (III) under acid conditions. If desired, the 5-acetamido-1,3,4-thiadiazole-2-carboxaldehyde (XI) may also be obtained from 5 - amino-1,3,4-thiadiazole-2-carboxaldehyde (III) by refluxing with acetic anhydride.

The following Flow Diagrams I, II and III, illustrate the reactions described hereinabove.

FLOW DIAGRAM I

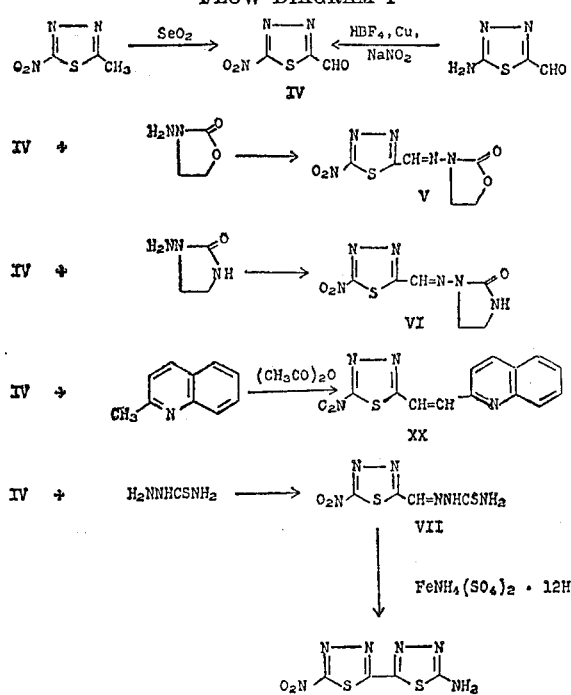

FLOW DIAGRAM II

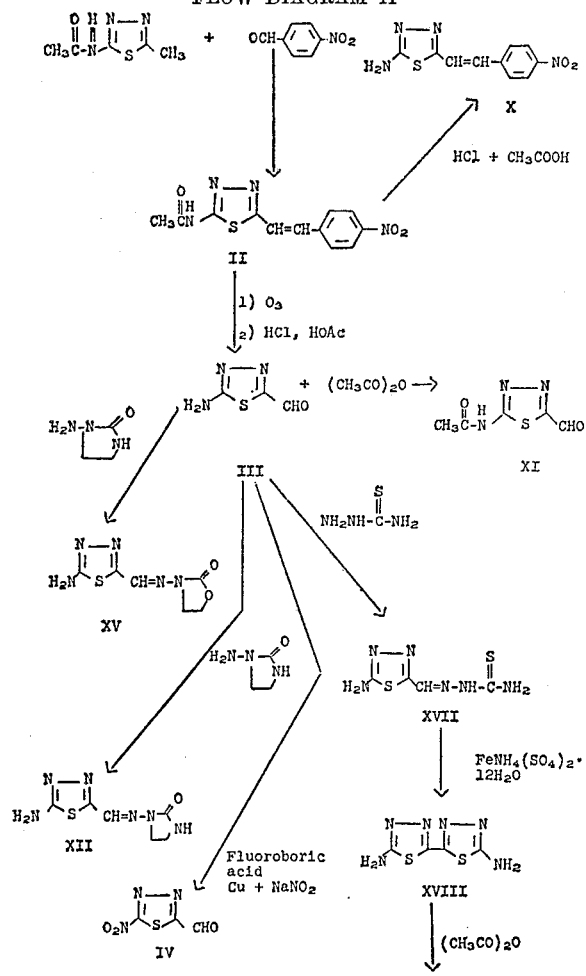

FLOW DIAGRAM III

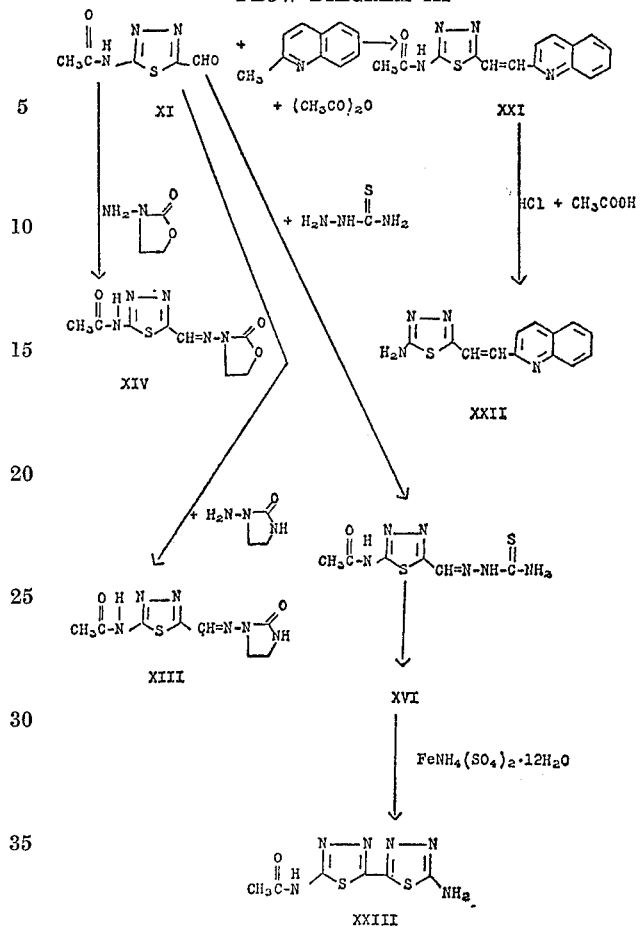

The compounds of the present invention are useful as antibacterial and antifungal agents. They find utility in such areas as treatment of industrial process waters used for cooling equipment and in paper manufacture to control slimes. Generally about 10 to 500 p.p.m. of the compounds of the present invention are effective for this purpose. As indicated, these compounds are also useful for protecting fabrics, textiles, leather and the like as well as agronomic crops, both growing and harvested, from the deleterious effects of these organisms.

In practice the compounds of the invention may be formulated with both solid and liquid diluents and applied in the form of dusts and sprays to the materials or plants for which protection is sought.

Dust formulations are generally prepared by admixing about 1% to 25% by weight of active compound with a finely divided carrier such as kaolin, attapulgite, diatomaceous earth, talc or the like can be applied with conventional dusting apparatus. For protection of growing plants generally about ½ lb. to 8 lbs. per acre of active ingredient is sufficient but somewhat higher rates may be employed if so desired.

Wettable powder formulations which are generally dispersed in an inexpensive liquid carrier, such as water or deodorized kerosene, for spray application, are usually prepared by admixing about 25% to 90% by weight of active ingredient with about 5% to 25% of a solid diluent, as described above with regard to dust formulation, about 1% to 3% of a wetting agent and about 2% to 5% of a dispersant. For application to crops, the wettable powder is dispersed in water in sufficient amount to provide about ½ lb. to 2 lbs. of active ingredient per 100 gallons of water and applied at the rate of about 100 to 400 gallons per acre.

DETAILED DESCRIPTION

The following examples describe the preparation of the present compounds and tests as antibacterial and antifungal agents.

EXAMPLE 1

Preparation of 5-nitro-1,3,4-thiadiazole-2-carboxaldehyde (IV)

The compound 2-methyl-5-nitro-1,3,4-thiadiazole (I) (0.73 g. or 5 mmole) and 0.55 g. (5 mmole) of selenium dioxide are mixed and heated until a highly exothermic reaction occurs. The mixture is cooled and extracted with methylene chloride. The extracts are dried and evaporated to dryness to give a red-brown liquid, which is the title compound; infrared spectrum (heat): 1700 (C=O), 1565 and 1355 (—NO$_2$) cm.$^{-1}$.

EXAMPLE 2

Preparation of β-(5-acetamido-1,3,4-thiadiazol-2-yl)-p-nitrostyrene (II)

To 157 g. (1.0 mole) of 2-acetamido-5-methylthiadiazole and 151 g. (1.0 mole) of p-nitrobenzaldehyde is added 1500 ml. of hot acetic anhydride and the mixture heated under reflux for 17 hours. The mixture is cooled, the yellow solid collected and washed thoroughly with acetone. After drying at 80° C., for 17 hours under reduced pressure, 198.7 g. of title compound is obtained. A sample purified from dimethylformamide-acetone mixture melts above 310° C.

EXAMPLE 3

Preparation of 5-amino-1,3,4-thiadiazole-2-carboxaldehyde (III)

In 700 ml. of ethyl acetate, 20 g. (0.069 mole) of β-(5 - acetamido - 1,3,4 - thiadiazol - 2 - yl)-p-nitrostyrene is treated with ozone (4% O$_3$ in O$_2$ stream, 0.08 mole per hr.) at −30 to −35° C. for 2 hours to give a tan-colored suspension. The reaction mixture is purged of ozone with nitrogen for 20 minutes. To this, 60 g. of sodium iodide in 40 ml. glacial acetic acid and 400 ml. of water are added which are followed by 80 g. of sodium thiosulfate in 800 ml. of water. The organic layer is separated after 500 ml. of ethyl acetate is added and the aqueous layer further extracted with 400 ml. of ethyl acetate. The extracts are dried over magnesium sulfate, filtered, and evaporated to give a yellow-brown sticky solid (20.5 g.). This material contains a mixture of p-nitrobenzaldehyde and 5 - acetamido - 1,3,4 - thiadiazole - 2 - carboxaldehyde. This mixture is heated on a steam bath for 70 minutes with 19 ml. of concentrated hydrochloric acid and 20 ml. of glacial acetic acid. Evaporation of the acids under reduced pressure gives a yellow solid, which is treated with 300 ml. of 10% hydrochloric acid to dissolve the aminothiadiazole aldehyde and the mixture is extracted twice with 200 ml. volumes of ethyl acetate to remove p-nitrobenzaldehyde. The aqueous acid phase is neutralized with sodium bicarbonate and then extracted with three 300 ml. volumes of ethyl acetate. These latter extracts are combined and dried over magnesium sulfate and evaporated to give 2.3 g. of solid yellow product (5 - amino - 1,3,4 - thiadiazole - 2 - carboxaldehyde; infrared λmax. (Nujol): 1688 cm.$^{-1}$ (C=O), NMR (acetone —d$_6$): 1.83 λ(—NH$_2$) and —0.04 λ(—CHO).

In a similar run, liquid-liquid extraction of the final aqueous phase with ethyl acetate gives a total yield of 4.1 g. of 5-amino-1,3,4-thiadiazole - 2 - carboxaldehyde, melting point 155–157° C. (dec.).

EXAMPLE 4

Preparation of 5-nitro-1,3,4-thiadiazole-2-carboxaldehyde (IV)

1.0 g. of 5 - amino - 1,3,4 - thiadiazole - 2 - carboxaldehyde is dissolved in a mixture of 2 ml. of 48–50% fluoboric acid and 5 ml. of water and added dropwise in about 20 minutes to a vigorously stirred suspension of 0.50 g. of copper powder in 2.0 g. of sodium nitrite in 10 ml. of water. The solution becomes green, foams, and a brown-yellow solid appears. The mixture is stirred for 30 minutes, filtered, and the insoluble solid washed with 50–75 ml. portions of hot chloroform until no more color is removed. The filtrate is extracted with ether (2 times with 100 ml. volumes), with 100 ml. of benzene, and with 100 ml. of chloroform. These extracts give about 0.1 g. of 5-nitro - 1,3,4 - thiadiazole - 2 - carboxaldehyde. The hot chloroform washes yield 0.60 g. of 5-nitro - 1,3,4 - thiadiazole - 2 - carboxaldehyde. These combined crude materials are dissolved in ether, filtered, and the filtrate evaporated to dryness to give 0.44 g. of purer title compound which is orange and exhibits a carbonyl band at about 1680–1700 cm.$^{-1}$ in the infrared; this material is semi-solid.

EXAMPLE 5

Preparation of 3-{[(5-nitro-1,3,4-thiadiazol-2-yl)methylene]-amino}-2-oxazolidinone (V)

A solution of 2.1 g. (0.013 mole) of 5-nitro-2-thiadiazolecarboxaldehyde in 15 ml. of 95% ethanol is added to a solution of 1.53 g. (0.015 mole) of 3 - amino - 2 - oxazolidinone in 10 ml. of 95% ethanol. The resulting solution is treated with 2 drops of concentrated hydrochloric acid and heated for 15 minutes on a steam bath. The yellow solid is collected and dried to give 1.1 g., melting point 248–250° C., of the title compound.

EXAMPLE 6

Preparation of 1-{[(5-nitro-1,3,4-thiadiazol-2-yl)methylene]-amino}-2-imidazolidinone (VI)

A solution of 1.8 g. (0.011 mole) of 5-nitro-1,3,4-thiadiazole - 2 - carboxaldehyde in 20 ml. of 95% ethanol is added to 40 ml. of a 0.33 M solution of 1-amino-2-imidazolidinone in dilute sulfuric acid and the mixture heated on a steam bath. Water is added to the mixture until a clear solution is obtained and after 30 minutes of heating, it is cooled. The brown needles are collected and recrystallized from 80 ml. of 67% aqueous ethanol to give 1.0 g. of yellow crystals, melting point 230–232° C. of the title compound.

EXAMPLE 7

Preparation of 5-nitro-1,3,4-thiadiazole-2-carboxaldehyde thiosemicarbazone (VII)

5 g. (0.031 mole) of 5 - nitro - 1,3,4 - thiadiazole-2-carboxaldehyde is dissolved in 50 ml. of 95% ethanol and 3.6 g. (0.04 mole) of thiosemicarbazide in 50 ml. of 50% aqueous ethanol and 5 drops of concentrated hydrochloric acid are added. The mixture is heated at 90–95° C. for 30 minutes, cooled, and the red solid collected. The yield of the title compound, melting point >290° C., is 4.0 g.

EXAMPLE 8

Preparation of 2-amino-5-(5-nitro-1,3,4-thiadiazol-2-yl)-1,3,4-thiadiazole (VIII)

A suspension of 1.0 g. of 5-nitro - 2 - thiadiazolecarboxaldehyde thiosemicarbazone in a solution of 8.0 g. of ferric ammonium sulfate dodecahydrate in 20 ml. of water is heated at 90–95° C. for 2 hours, cooled, and the solid collected. The solid is recrystallized from 1:1 ethanol-acetone mixture which contains small amounts of dimethylformamide to give yellow crystals, melting point 240° C. (dec.), of the title compound.

EXAMPLE 9

Preparation of 2-methyl-5-nitro-1,3,4-thiadiazole (I)

A solution of 2.78 g. (0.024 mole) of 2-methyl-5-amino-thiadiazole in 17.5 ml. of 48–50% fluoroboric acid is stirred at 0° C. while 1.67 g. (0.024 mole) of sodium nitrite is added over 30 minutes. The mixture is stirred for 20 minutes at 0° C. and then added dropwise to a vigorously stirred suspension of 4.9 g. of copper powder in a solution of 24.7 g. of sodium nitrite in 50 ml. of water at 25° C. The mixture is stirred for 30 minutes, filtered, and the filter cake washed thoroughly with water. The combined filtrate and washings are extracted with three 150 ml. volumes of benzene. The combined extracts are dried and evaporated under reduced pressure to give 1.75 g., melting point 54–55° C., of 2-methyl-5-nitro-1,3,4-thiadiazole.

EXAMPLE 10

Preparation of β-(5-amino-1,3,4-thiadiazol-2-yl)-p-nitrostyrene (X)

A suspension of 5.0 g. of β-(5-acetamido - 1,3,4 - thiadiazol - 2 - yl)-p-nitrostyrene in 20 ml. of concentrated hydrochloric acid and 20 ml. of glacial acetic acid is heated to reflux temperature for 2 hours. The solid is collected, washed with ether, and dried to afford 4.4 g. of solid. This solid is washed with 25 ml. of 5% sodium bicarbonate solution and heated to 50–55° C. until foaming stops. The solid is collected, washed with water and dried to give 0.81 g. of yellow β-(5-amino - 1,3,4 - thiadiazol-2-yl)-p-nitrostyrene, melting point 284° C. (dec.).

EXAMPLE 11

Preparation of 5-acetamido-1,3,4-thiadiazole-2-carboxaldehyde (XI)

A portion of 1.29 g. (0.01 mole) of 5-amino-1,3,4-thiadiazole-2-carboxaldehyde is heated with 5 ml. of acetic anhydride at reflux temperature, cooled and evaporated to dryness. The yellow solid is washed with saturated aqueous sodium carbonate solution to afford 5-acetamido-1,3,4-thiadiazole-2-carboxaldehyde.

EXAMPLE 12

Preparation of 1-{[(5-amino-1,3,4-thiadiazol-2-yl)methylene]-amino}-2-imidazolidinone (XII)

The compound 5-amino-1,3,4-thiadiazole-2-carboxaldehyde (1.29 g. or 0.01 mole) is reacted with 1-amino-2-imidazolidinone in the manner described in Example 6 to give 1-{[(5 - amino-1,3,4-thiadiazol-2-yl)methylene]-amino}-2-imidazolidinone, which is collected as a pale yellow solid.

EXAMPLE 13

Preparation of 1-{[(5-acetamido-1,3,4-thiadiazol-2-yl)-methylene]-amino}-2-imidazolidinone (XIII)

To 1.71 g. (0.01 mole) of 5-acetamido-1,3,4-thiadiazole-2-carboxaldehyde in 20 ml. of 95% ethanol is added to 40 ml. of a 0.33 M solution of 1-amino-2-imidazolidinone in the manner described in Example 6 to give solid 1-{[(5-acetamido-1,3,4 - thiadiazol-2-yl)methylene]amino}-2-imidazolidinone.

EXAMPLE 14

Preparation of 3-{[(5-acetamido-1,3,4-thiadiazol-2-yl)methylene]-amino}-2-oxazolidinone (XIV)

The compound 3-amino-2-oxazolidinone is reacted in equimolar amounts with 5-acetamido-1,3,4-thiadiazole-2-carboxaldehyde in the manner described in Example 5 to give 3 - {[(5-acetamido-1,3,4-thiadiazol-2-yl)methylene]amino}-2-oxazolidinone, which is collected as an off-white solid.

EXAMPLE 15

Preparation of 3-{[(5-amino-1,3,4-thiadiazol-2-yl)methylene]-amino}-2-oxazolidinone (XV)

Equimolar quantities of 5 - amino-1,3,4-thiadiazole-2-carboxaldehyde and 3-amino-2-oxazolidinone are reacted in the manner described in Example 5 to give 3-{[(5-amino - 1,3,4 - thiadiazol-2-yl)methylene]amino}-2-oxazolidinone, which is collected by filtration as a solid.

EXAMPLE 16

Preparation of 5-acetamido-1,3,4-thiadiazole-2-carboxaldehyde thiosemicarbazone (XVI)

5-acetamido-1,3,4-thiadiazole - 2 - carboxaldehyde is reacted with an equimolar quantity of thiosemicarbazide in the manner described in Example 7 to give the above compound, which is collected by filtration as a solid.

EXAMPLE 17

Preparation of 5-amino-1,3,4-thiadiazolecarboxaldehyde thiosemicarbazone (XVII)

In 15 ml. of 95% ethanol, 1.29 g. (0.01 mole) of 5-amino-1,3,4-thiadiazole-2-carboxaldehyde and 0.92 g. of thiosemicarbazide are reacted in the manner described in Example 7 to give the above compound, which is collected by filtration as a solid.

EXAMPLE 18

Preparation of 2-amino-5-(5-amino-1,3,4-thiadiazol-2-yl)-1,3,4-thiadiazole (XVIII)

The title compound is prepared in the manner described in Example 8 by cyclizing 2-amino-1,3,4-thiadiazole-2-carboxaldehyde thiosemicarbazone and collecting the product as a solid.

EXAMPLE 19

Preparation of 2-acetamido-5-(5-acetamido-1,3,4-thiadiazol-2-yl)-1,3,4-thiadiazole (XIX)

The compound 2-amino-5-(5-acetamido-1,3,4-thiadiazol-2-yl)-1,3,4-thiadiazole is refluxed with acetic anhydride for ½ hour, evaporated to dryness, and the remaining solid washed with saturated aqueous sodium carbonate to give the title compound.

EXAMPLE 20

Preparation of 2-[2-(5-nitro-1,3,4-thiadiazol-2-yl)vinyl]quinoline (XX)

In 3 ml. of glacial acetic acid at 60–70° C., 0.72 g. (5 mmole) of freshly distilled quinaldine and 0.8 g. (5 mmole) of 5-nitro-1,3,4-thiadiazole - 2 - carboxaldehyde are stirred while 0.8 ml. of acetic anhydride is added dropwise. The mixture is refluxed for 4 hours, cooled, and the solvents are evaporated under reduced pressure. The remaining solid is washed with ether and collected by filtration to give the above compound.

EXAMPLE 21

Preparation of 2-[2-(5-acetamido-1,3,4-thiadiazol-2-yl)vinyl]quinoline (XXI)

The title compound is prepared as described in Example 20 by reacting 5-amino-1,3,4-thiadiazole-2-carboxaldehyde with quinaldine in the presence of acetic anhydride.

EXAMPLE 22

Preparation of 2-[2-(5-amino-1,3,4-thiadiazol-2-yl)vinyl]quinoline (XXII)

The above compound is obtained by treating 1 g. of 2-[2-(5-acetamido-1,3,4-thiadiazol-2-yl)vinyl]quinoline with 5 ml. of concentrated hydrochloric acid in 5 ml. of glacial acetic acid for 2 hours on a steam bath and neutralizing the mixture with saturated aqueous sodium carbonate solution. The solid product is collected by filtration and washed with water.

EXAMPLE 23

The antibacterial activity of the compounds of the present invention is demonstrated by the following tests wherein test compounds are dissolved in deionized water in sufficient amount to provide 100 p.p.m. of compound in the water. Test solutions are then sterilized and inoculated with a bacterial cell suspension of the test organism.

EXAMPLE 24

The antifungal activity of the compounds of the invention is demonstrated by the following test wherein 7–10 day cultures of *M. fructicola*, 14 day cultures of *S. sarcinaeforme* and 7 day cultures of *A. niger* are separately washed from slants with deionized water and the suspensions filtered to remove large pieces of mycelium. Two ml. of orange juice are added per liter of spore suspension to facilitate germination. "Opticular" vials are then partially filled with the individual suspensions of test organism and a sufficient amount of aqueous solution or suspension of test compound added to provide 100 p.p.m. thereof to the test vials. The vials are placed on a tumbler and rotated for 24 hours to expose the organisms to the test compounds. At the end of a 24 hour exposure period the suspensions are examined macroscopically. Data are recorded as percent of the spores that have not germinated and are reported below.

TABLE II

| Compound | Rate, p.p.m. | M. fructicola | S. sarcinaeforme | A. niger |
|---|---|---|---|---|
| $O_2N-\underset{S}{\underset{\|}{N-N}}-\underset{S}{\underset{\|}{N-N}}-NH_2$ | 100 | 100 | 100 | 100 |
| $O_2N-\underset{S}{\underset{\|}{N-N}}-CH_3$ | 100 | 100 | 100 | 100 |

The bacterial cell suspensions are 24-hour broth (0.1% dextrose-1.0% peptone) cultures that were inoculated with bacteria from 7-day Nutrient Agar Slants. After exposure for 24 hours, each test solution is treated with 10% by volume of a 1% dextrose-10% peptone broth. The treated solutions are then incubated for 24 hours at 37° C. and then examined for the presence or absence of bacterial growth. Determinations are made by turbidity readings. Solutions with no bacterial growth are subcultured to determine if the bacteria have been killed. Data are recorded as follows: 9=kill; 5=stasis; 0=no apparent effect.

Bacteria employed are *Aerobacter aerogenes*, a gram negative organism used by the Paper Institute to evaluate slime control agents for paper mills. *Staphylococcus aureus*, a gram positive common on the skins of man and animals and certain strains of which are pathogenic, and *Xanthomonas vesicatoria*, a gram negative organism which incites bacteriosis of tomatoes and peppers.

Data obtained are provided in Table I.

As indicated above the organisms used are *Monilinia fructicola*, the pathogen that incites American brown rot of stone fruits; *Stemphylium sarcinaeforme*, the pathogen which incites leaf spot of legumes and *Aspergillus niger*, the saprophyte that degrades textiles, fabrics, leathers, fruits and vegetables.

EXAMPLE 25

The antibacterial activity of the compounds of the present invention is further demonstrated in the following tests wherein trypticase soy agar plates are prepared containing 4 to 250 mcg./ml. of test compounds.

The plates stored at room temperature overnight then are inoculated with the desired cultures. After inoculation the plates are permitted to dry, then inverted and incubated for 24 hours at 37° C. After the incubation the plates are examined and growth or no growth determinations made by comparison with growth control plates. The results are recorded and reported below in Table III as the minimum concentration (mcg./ml.) required to

TABLE I

| Compound | Rate, p.p.m. | A. aerogenes | S. aureus | X. vesicatoria |
|---|---|---|---|---|
| $O_2N-\underset{S}{\underset{\|}{N-N}}-CH_3$ | 100 | 0 | 9 | 9 |
| $O_2N-\underset{S}{\underset{\|}{N-N}}-\underset{S}{\underset{\|}{N-N}}-NH_2$ | 100 | 9 | 9 | 5 |
| $O_2N-\underset{S}{\underset{\|}{N-N}}-CH=N-NH-\overset{S}{\underset{\|}{C}}-NH_2$ | 100 | 9 | 5 | 9 | prevent growth of the organism. Organisms employed are recorded below.

| Abbreviation | | Gram positive bacteria—Name |
|---|---|---|
| 1 | B.c. | *Bacillus cereus.* |
| 2 | B.s. | *Bacillus subtilis.* |
| 3 | B.t. | *Bacillus thuringiensis.* |
| 4 | C.x. | *Corynebacterium xerosis.* |
| 5 | M. | *Micrococcus.* |
| 6 | S.a. | *Staphylococcus aureus.* |
| 7 | S.a. | *Streptococcus agalactiae.* |
| 8 | S.f. | *Streptococcus faecalis.* |
| | | Gram negative bacteria—Name |
| 9 | A.a. | *Aerobacter aerogenes.* |
| 10 | A.f. | *Alcaligenes faecalis.* |
| 11 | B.b. | *Bordetella bronchiseptica.* |
| 12 | E.c. | *Escherichia coli.* |
| 13 | P.m. | *Pasteurella multocida.* |
| 14 | S.c. | *Salmonella choleraesuis.* |
| 15 | S.d. | *Salmonella dublin.* |
| 16 | S.g. | *Salmonella gallinarum.* |
| 17 | S.t. | *Salmonella typhi.* |
| 18 | S.c. | *Saccharomyces cerevisiae.* |

TABLE III

| Compound | Dose, mcg./ml. | Organisms |
|---|---|---|
| 5-nitro-1,3,4-thiadiazole-2-carboxaldehyde thiosemicarbazone. | 125 | S.t., S.c. |
| 3-{[(5-nitro-1,3,4-thiadiazol-2-yl)-methylene]amino}-2-oxazolidinone. | 125 | B.s., C.x., A.f., P.m. |
| | 250 | B.c., B.b., S.c., S.g., S.t., S.c. |
| 1-{[(5-nitro-1,3,4-thiadiazol-2-yl)methylene]amino}-2-imidazolidinone. | 31 | P.m. |
| | 62 | C.x., M., B.b., S.c. |
| | 125 | B.c., B.s., S.a., A.s., A.f., E.c., S.g., S.t., S.c. |
| | 250 | S.f. |
| 2-amino-5-(5-nitro-1,3,4-thiadiazol-2-yl)-1,3,4-thiadiazole. | 250 | A.f., P.m. |

What is claimed is:
1. A compound of the formula:

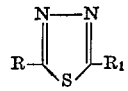

wherein R is selected from the group consisting of amino, nitro and lower alkanoylamino and $R_1$ is selected from the group consisting of

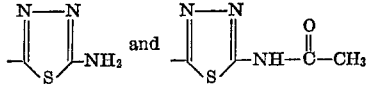

2. The compound in accordance with claim 1, 2-amino-5-(5-nitro-1,3,4-thiadiazol-2-yl)-1,3,4-thiadiazole.
3. The compound in accordance with claim 1, 2-amino-5-(5-amino-1,3,4-thiadiazol-2-yl)-1,3,4-thiadiazole.
4. The compound in accordance with claim 1, 2-acetamido-5-(5-acetamido-1,3,4-thiadiazol - 2 - yl)-1,3,4-thiadiazole.
5. A compound in accordance with claim 1 of the formula:

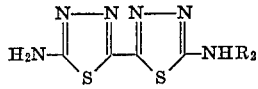

in which $R_2$ is hydrogen or acetyl.

References Cited
UNITED STATES PATENTS
3,497,597   2/1970   Tomcufcik et al. _____ 424—270

ALAN L. ROTMAN, Primary Examiner
C. M. S. JAISLE, Assistant Examiner

U.S. Cl. X.R.
260—240 E; 424—258, 270